J. C. BIRD.
CONNECTING ROD.
APPLICATION FILED DEC. 7, 1908.
912,791.
Patented Feb. 16, 1909.
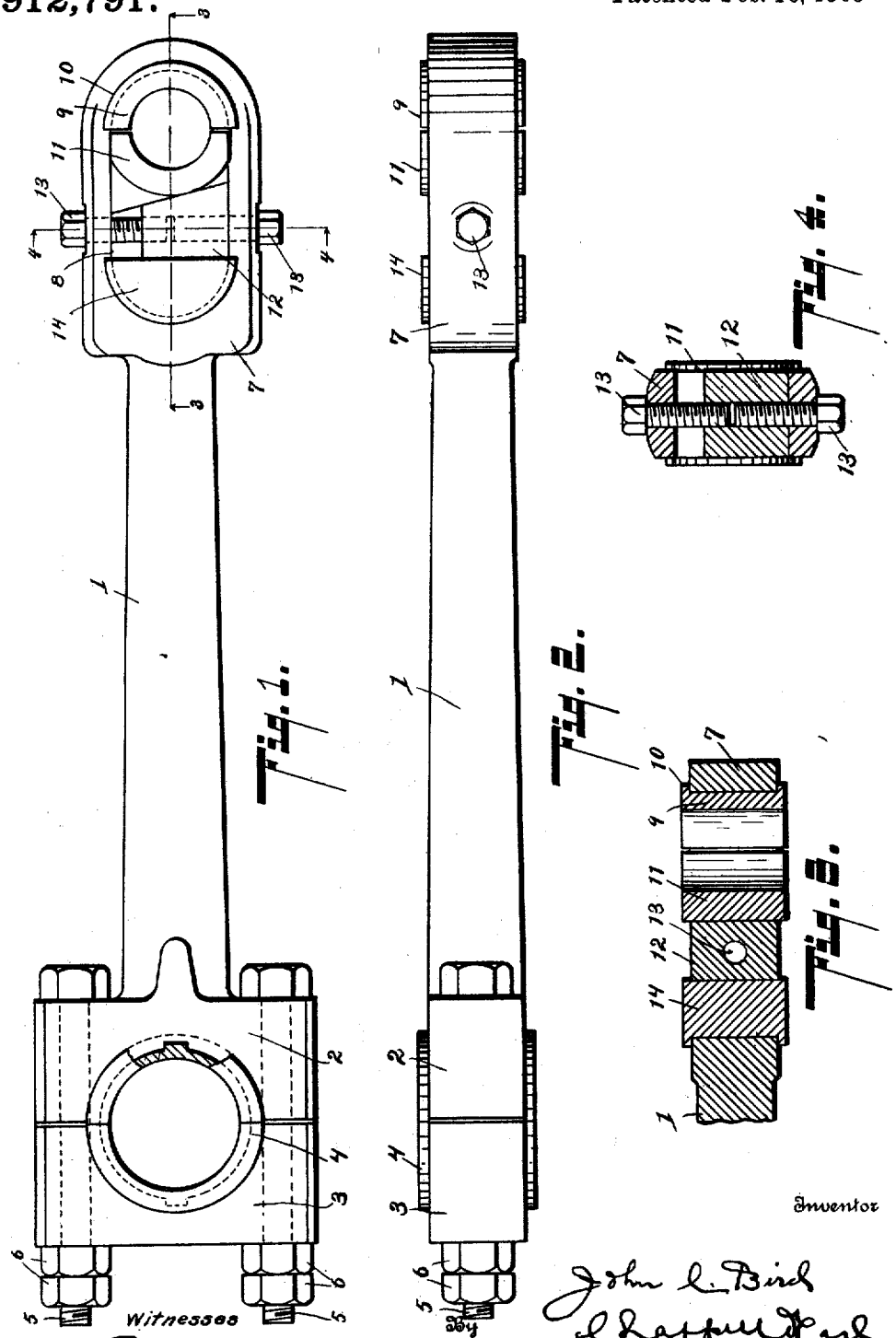

UNITED STATES PATENT OFFICE.

JOHN C. BIRD, OF BATTLE CREEK, MICHIGAN, ASSIGNOR TO UNION STEAM PUMP COMPANY, OF BATTLE CREEK, MICHIGAN.

CONNECTING-ROD.

No. 912,791.  Specification of Letters Patent.  Patented Feb. 16, 1909.

Application filed December 7, 1908. Serial No. 466,365.

*To all whom it may concern:*

Be it known that I, JOHN C. BIRD, a citizen of the United States, residing at Battle Creek, county of Calhoun, State of Michigan, have invented certain new and useful Improvements in Connecting-Rods, of which the following is a specification.

This invention relates to improvements in connecting rods.

The main objects of this invention are: First, to provide in a connecting rod an improved bearing which can be easily and accurately adjusted when the parts are assembled, and requires but little adjustment later. Second, to provide a structure which is very desirable and at the same time very economical to produce, and very durable in use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a side elevation of a connecting rod embodying the features of my invention. Fig. 2 is plan view thereof. Fig. 3 is an enlarged detail through the bearing sections or members and the supports therefor, removed from the rod, taken on a line corresponding to line 3—3 of Fig. 1. Fig. 4 is a transverse section taken on a line corresponding to line 4—4 of Fig. 1.

In the drawings, similar reference characters refer to similar parts throughout the several views, and the sectional views are taken looking in the direction of the little arrows at the ends of the section lines.

Referring to the drawing, I have illustrated my invention embodied in a connecting rod for engines, the rod 1, illustrated, being provided with a bearing block member 2, formed integrally therewith, and with a detachable section 3, which is adjustably secured in position to secure the babbitt bushing 4, by means of suitable bolts and nuts, as 5 and 6 respectively. The opposite end of the rod is provided with a head 7, having a slot 8 therein, the ends of the slot being in the arc of a circle.

The bearing member or section 9 is cylindrical to correspond or fit into one curved end of the opening, and is preferably provided with flanges 10 at each end, which engage the sides of the head and retain the bearing member against longitudinal movement. The bearing member or section 11 is adjustably arranged in the opening 8, and coacts with the bearing member 9. The bearing member or section 11 is wedge shaped or inclined on its rear face, and is supported and adjustably held in the opening 8 by means of the wedge shaped adjusting block 12. The block 12 is adjusted transversely of the head to secure the adjustment of the bearing member 11, preferably by means of oppositely arranged screws 13. The block 12 is supported by the supporting block 14, which is cylindrical to correspond to or fit into the other end of the opening 8. By thus forming the parts, they may be readily assembled and adjusted to adjust the bearing members or sections to the crank pin, the parts readily seating themselves so that frequent adjustment is not required, when the structure is first put into use, as is necessary in the structures in common use. The bearing members are not distorted by this adjustment, as the supporting block 14 readily accommodates itself to the wedge block.

My improved structure is very economical to produce on account of the form and structure of the parts, which can be easily made, and can be easily assembled and adjusted in the first assembly, and, should occasion require, can be readily disassembled for the renewal of a worn bearing. Further objects will readily appear to those skilled in the art to which this invention relates.

Having thus described my invention, what I claim as new and desire to secure by Letters Patent is:

1. The combination with the rod, of a head having an opening therein, the ends of said opening being curved; a cylindrical bearing section adapted to fit one end of said opening, and having flanges at its ends to engage the sides of said head; a wedge shaped bearing section adjustably arranged in said opening; a wedge shaped adjusting block; a pair of oppositely arranged adjusting screws; and a cylindrical supporting block for said adjusting block, adapted to fit the other end of said opening, said supporting block having flanges at its ends to engage the sides of said head.

2. The combination with the rod, of a head having an opening therein, the ends of said opening being curved; a cylindrical bearing section adapted to fit one end of said opening; a wedge shaped bearing section adjustably arranged in said opening; a wedge shaped adjusting block; a pair of oppositely arranged adjusting screws; and a cylindrical supporting block for said adjusting block, adapted to fit the other end of said opening.

3. The combination with a supporting member having an opening therein, the ends of said opening being curved; a cylindrical bearing section adapted to fit one end of said opening and having flanges at its ends to engage the sides of said head; a wedge shaped bearing section adjustably arranged in said opening; a wedge shaped adjusting block; means for adjusting said block; and a cylindrical supporting block for said adjusting block, adapted to fit the other end of said opening, said supporting block having flanges at its ends to engage the sides of said head.

4. The combination with a supporting member having an opening therein, the ends of said opening being curved; a cylindrical bearing section adapted to fit one end of said opening; a wedge shaped bearing section adjustably arranged in said opening; a wedge shaped adjusting block; means for adjusting said block; and a cylindrical supporting block for said adjusting block, adapted to fit the other end of said opening.

In witness whereof, I have hereunto set my hand and seal in the presence of two witnesses.

JOHN C. BIRD. [L. S.]

Witnesses:
E. P. ORDWAY,
L. F. PERRIN.